United States Patent
Chang et al.

(10) Patent No.: US 6,671,068 B1
(45) Date of Patent: Dec. 30, 2003

(54) ADAPTIVE ERROR DIFFUSION WITH IMPROVED EDGE AND SHARPNESS PERCEPTION

(75) Inventors: William Ho Chang, Vancouver, WA (US); Scott Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/408,626

(22) Filed: Sep. 30, 1999

(51) Int. Cl.$^7$ ............................................... G06K 15/00
(52) U.S. Cl. ...................... 358/1.9; 358/3.03; 358/3.05; 382/252
(58) Field of Search ................. 358/3.01, 3.21, 358/3.22, 3.03, 3.05, 1.9; 382/237, 251, 252, 270

(56) References Cited

U.S. PATENT DOCUMENTS

| | | | |
|---|---|---|---|
| 4,878,125 A | * 10/1989 | Katayama et al. | 358/3.03 |
| 5,006,938 A | * 4/1991 | Mita | 358/3.19 |
| 5,045,952 A | 9/1991 | Eschbach | |
| 5,051,844 A | * 9/1991 | Sullivan | 358/3.03 |
| 5,068,746 A | * 11/1991 | Ohsawa et al. | 382/252 |
| 5,070,413 A | 12/1991 | Sullivan | |
| 5,313,287 A | * 5/1994 | Barton | 382/252 |
| 5,473,439 A | 12/1995 | Pappas | |
| 5,493,416 A | 2/1996 | Fan | |
| 5,555,103 A | 9/1996 | Anderson et al. | |
| 5,561,751 A | 10/1996 | Wong | |
| 5,663,810 A | * 9/1997 | Kirk | 358/3.03 |
| 5,673,121 A | 9/1997 | Wang | |
| 5,692,109 A | 11/1997 | Shu et al. | |
| 5,696,602 A | 12/1997 | Cooper | |
| 5,712,927 A | * 1/1998 | Kim et al. | 382/252 |
| 5,726,772 A | 3/1998 | Parker et al. | |
| 5,737,452 A | 4/1998 | Schiller | |
| 5,737,453 A | 4/1998 | Ostromoukhov | |
| 5,745,259 A | 4/1998 | Ulichney | |
| 5,757,976 A | * 5/1998 | Shu | 382/252 |
| 5,809,177 A | 9/1998 | Metcalfe et al. | |
| 6,449,061 B2 | * 9/2002 | Metcalfe | 358/3.05 |

* cited by examiner

*Primary Examiner*—Thomas D. Lee
(74) *Attorney, Agent, or Firm*—Marger Johnson & McCollom PC

(57) ABSTRACT

A method for adaptive error diffusion. The method includes the steps of receiving input image data, detecting edges in the input image data, and then adding noise to the input image data depending upon results of said edge detection. The amount of noise is higher for pixels with higher edge content, unless the pixel is on an edge that is already sharp. Once the noise is added the method performs error diffusion on the noise-enhanced image data and it produces output image data. Alternatively, noise can be added to the thresholding portion of the error diffusion process.

16 Claims, 1 Drawing Sheet

ADAPTIVE ERROR DIFFUSION WITH IMPROVED EDGE AND SHARPNESS PERCEPTION

BACKGROUND OF THE INVENTION

1. Field of the Invention

This invention relates to the field of digital image processing and more particularly to methods of digital image processing using high pass noise modulation for enhanced sharpening.

2. Background of the Invention

Digital halftoning employs digital image processing to produce continuous tone images using fewer luminance or chrominance levels than the input image. A considerable amount of work has been done in this area. This work generally divides along dithering and error diffusion approaches. Both seek to produce pleasing images using digital halftoning.

The dithering approaches, usually called ordered dithering, typically use some type of matrices with integer threshold values. These values are irepeatedly compared to the input image and laid down in the output image in a periodic-tiling manner. However, because of the repeated nature of the tiling process, an artificial pattern or border is sometime visible. The output image may also have low frequency spatial characteristics that increase artifacts, produce less detail and reduce image quality. In addition, information is truncated, resulting in a loss of available image information.

Several approaches have developed improvements to the dithering approach. Frequency modulation produces a screen or threshold array with high frequency content. This is typically known as a stochastic screen or blue noise mask. As these screens or masks are random, they do not produce identifiable patterns. Several techniques are taught in the current state of the art to generate these masks and screens.

One approach, exemplified by U.S. Pat. No. 5,726,772, issued Mar. 10, 1998, teaches generation of blue noise masks using a high pass filter in the frequency domain. Another uses a dot profile and then iteratively optimizes the threshold against a particular gray level. This is shown in U.S. Pat. No. 5,737,452, issued Apr. 7, 1998.

More formulaic approaches are also used. In one approach, shown by U.S. Pat. No. 5,673,121, issued Sep. 30, 1997, a uniform distance technique is used to generate the masks. Another technique uses variance minimization to optimize the screens, shown in U.S. Pat. No. 5,696,602, issued Dec. 9, 1997. A deterministic void and cluster technique is shown in U.S. Pat. No. 5,745,259, issued Apr. 28, 1998. A final example in this area is shown in U.S. Pat. No. 5,555,103, issued Sep. 10, 1996, in which a golden mean number series similar to the Fibonacci sequence is used to derive the masks.

All of these techniques have a distinct disadvantage. Errors in these approaches are truncated and the fine details of the image are lost. The resulting output image often has a grainy appearance.

A second approach, well known in the current art as mentioned previously, is error diffusion. Error diffusion was first disclosed by Floyd and Steinberg in 1976, hence it is typically referred to as Floyd-Steinberg error diffusion. The basic process is shown in FIG. 1. The digital image input typically comprises a pixel value that has some level of gray, expressed in binary terms. For example, in a system with 8-bits of image data, the gray level will be some level between 0 and 255 ($2^8$ levels). For an example, a gray level of 200 will be assumed.

In digital printing, however, the value of an ON dot will be 255, and OFF will be 0. For the levels in between these two values, a threshold is used to determine whether a dot is 'more' ON or OFF. If the dot's value is above the threshold, in this example the threshold equals 128, the dot is turned ON, if it is below, it is turned OFF.

Therefore, an error exists between the intended value and the printed value of the dot. For example, if a dot has an intended value of 200, it lies above the threshold and will be turned ON. Its printed value will be 255, so there is an error of +55 between its intended and printed values.

In error diffusion, the error value can be assigned to the next dot, since the dots are so relatively small in the perceived human eye response; the eye will tend to integrate the next several dots into one larger spot of color. Floyd and Steinberg suggested using four yet-to-be-processed pixels that neighbor the pixel with the error value.

The Floyd-Steinberg approach is shown in FIG. 1. The threshold is applied to the input value, which in this example is 200. The threshold is 128, so that dot is printed. The resulting difference between the intended value of 200 and the printed value of 255 is +55. It will be diffused to the neighbors with the weights of 7 5 3 1, in the positions shown at 14. The sum of the weights is 16, so the error value $e(ij)=55/16=3.44$. The following table demonstrates the result of error diffusion on the neighboring pixels for a threshold of 128. The original value for all pixels is 144.

| Error weight | Error Value | Resulting Error | Original - Error | Result |
|---|---|---|---|---|
| 7 | 3.44 | 24 | 120 | 0 |
| 5 | 3.44 | 17 | 127 | 0 |
| 3 | 3.44 | 10 | 134 | 255 |
| 1 | 3.44 | 3 | 139 | 255 |

It must be understood that the error values computed for each pixel are only those from the previous pixel. Other error values exist for the pixels from other neighboring pixels. For example, if X in the below diagram is the pixel with value 200 from the example, Y is the neighboring pixel. The pixel that has the 5 weight from X is the pixel that has the 3 weight from Y. The error diffusion for X is in parentheses ( ), the error diffusion for Y in the brackets [].

|  | X | Y(7) | [7] |
|---|---|---|---|
| X error diffusion() (3) | (5)[3] | (1)[5] | [1] |

As mentioned above, the flowchart for this process is shown in FIG. 1. Error diffusion has better quality and accuracy than stochastic screening because the error is not truncated, but passed onto other pixels, as shown above. Error diffusion has the ability to adapt its output to the local needs of the image, and introduces edge enhancement qualities into the output image.

Unfortunately, error diffusion can also result in several objectionable artifacts in the output image. These typically occur in highlights and shadows, producing transient noise, worms and edge delays. In midtone areas, the artifacts result in unpleasant patterns and pattern shifts. As a result, several enhancements have been proposed for error diffusion.

These enhancements fall generally into two areas. The first area involves manipulation of the error filter, such as using a bigger mask or filter, or combining the error filter with white noise, blue noise, angle screens or line screens. Examples of these last approaches can be found in U.S. Pat. No. 5,493,416, issued Feb. 20, 1996; U.S. Pat. No. 5,313,287, issued May 17, 1994; and U.S. Pat. No. 5,809,177, issued Sep. 15, 1998.

The other area includes approaches that manipulate the threshold values. Examples include U.S. Pat. No. 5,054,952, issued Sep. 30, 1991; U.S. Pat. No. 5,737,453, issued Apr. 7, 1998; and U.S. Pat. No. 5,692,109, issued Nov. 21, 1997. There are other techniques that have been used as well, including vector error diffusion, which quantizes color error diffusion using weights or penalty functions, shown in U.S. Pat. No. 5,561,751, issued Oct. 11, 1996.

However, these enhancements do not sufficiently improve the Floyd-Steinberg results, when compared to the costs associated with applying them. For example, enhancements that add noise reduce or eliminate artifacts but sacrifice detail and smoothness. The noise introduces graininess to the image. Other algorithms produce good results but are either too slow or too costly to implement.

Other development efforts have focused on creating smooth outputs without artifacts, mostly driven by the increased popularity of inkjet printers. Characteristics of these approaches, which will be referred to as spatially enhanced error diffusion, include nicely placed and well spread dot patterns in highlight and shadow areas. Some approaches use human visual models and printer models based upon enhanced error diffusion. In addition to other examples discussed above, these techniques are exemplified by U.S. Pat. No. 5,051,844, issued Sep. 24, 1991; U.S. Pat. No. 5,070,413, issued Dec. 3, 1991; and U.S. Pat. No. 5,473,439, issued December 5, 1995.

The spatially enhanced error diffusion approaches have the same problems as the enhanced error diffusion techniques in that they are computationally intensive and reduce system performance when implemented in products. In addition, these approaches suffer from reduction of the sharpening effect, although they generally produce smoother and more detailed output.

Therefore, a method is needed that has the advantage of error diffusion of preserving image content by not truncating error, does not produce artifacts such as worms or transient noise, is not computationally intensive, and preserves the sharpening effect provided by the error diffusion process.

SUMMARY OF THE INVENTION

One aspect of the invention is an adaptive error diffusion process for producing images. The method includes the steps of receiving input image data, detecting edges in the data, and adding noise to the data depending upon the results of the edge detection. Error diffusion is then performed on the data, where the error diffusion process is altered because of the noise added to the data. The amount of noise added to the data is higher for pixels that have high edge content.

In an alternate embodiment, the noise is added to the threshold used in the error diffusion process. The noise used in either embodiment can be white, blue, green, pink or patterned noise, as examples. The error diffusion process can be the typical Floyd-Steinberg error diffusion process or spatially enhanced error diffusion.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
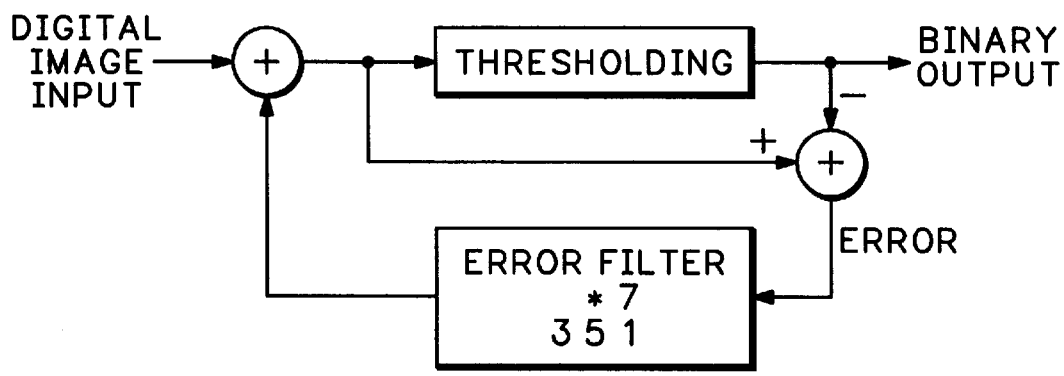
FIG. 1 shows a flowchart of a prior art process for error diffusion.

FIG. 1 shows the prior art Floyd-Steinberg error diffusion process. The input image data for a given pixel at position (i,j) in the image, x(i,j) has an error value added to it, e(i,j). In order to better understand the values used to manipulate x(i,j), the discussion will focus on the previous pixel. The previous pixel will be assumed to have the position of x(i−1,j). This pixel was either turned ON or OFF depending upon the results of the thresholding step.

As discussed previously, the value of the pixel at either ON or OFF is then subtracted from the intended value of the pixel prior to the thresholding step. This value is referred to as v(i−1,j). The difference between these two values then becomes the error for that pixel. The actual error value for the next pixel, x(i,j), depends upon the filter A(i,j) and the particular error weighting passed on to that particular pixel. In this example, the error weighting is $7/16$, $1/16$, $5/16/$ and $3/16$. The error value e(i,j) is then added to the value for the current pixel x(i,j).

Mathematically, this can be expressed as follows:

$$b(i,j)=\text{step}[x(i,j)+\Sigma A(m,n)*e(i-m,j-n)-T], \text{ where}$$

$$e(i,j)=b(i,j)-[x(i,j)+\Sigma A(m,n)*e(i-m,j-n)]$$

The value T is the threshold value. This is typically set to 128 or 127.5, depending upon integer or floating point implementation. The function step is the function that produces either an ON or OFF value for x(i,j).

The Floyd-Steinberg error diffusion produces a desirable sharpening effect on the resulting image. Spatially enhanced error diffusion techniques are more accurate than the standard error diffusion. However, it is less affected by the sharpening effect. Therefore, although spatially enhanced error diffusion produces a smoother and more detailed output, it is less sharp and can create a perceived blurring compared to standard error diffusion.

One aspect of this invention is to overcome that particular drawback of spatially enhanced error diffusion. However, in order to understand the invention better, it is necessary to discuss basics of the human visual system.

The human visual system is often modeled as having a two-dimensional bank of localized spatial filters in the early stages. This bank of filters is analogous to an equalizer component of an audio system. Due to the properties of the eye and some low-level processing in the retina, a global filter effectively precedes this bank. These filters are sometimes referred to as channels.

The contrast sensitivity function (CSF) measures the aggregate response of these channels, by measuring threshold as a function of spatial frequency. In optical systems, an analogy to the CSF is the MTF, or modulation transfer function. The MTF measures the response of the lens as a function of spatial frequency. The term optical transfer function (OTF) can apply to either the CSF, when referring to the eye, or MTF, when referring to lenses in an image capture system. The physical components of sharpness arise mostly because of the MTF of the capturing lens.

As the MTF increases in bandwidth, higher frequencies are captured. Two types of effects result from these higher frequencies. The first type results in smaller objects that can be delineated due to the smaller spacing of the zero crossings associated with the higher frequencies passed by the system. The viewer can see more and smaller objects, as well as the textures of a single object. The second type of effect gives edges a steeper slope. This does not necessarily lead to more information in terms of the number of objects or the ability to see smaller objects. The edge effect is referred to in the art as sharpness, snap or crispness. The delineation of smaller or more objects is referred to as detail.

An increase in the MTF of a lens leads to both of these effects. In photography and digital imaging, non-physical processes can be applied that only affect sharpness, without increasing detail. One technique increases the image contrast, causing the increase of the slope of an edge gradient. While increasing sharpness, it can actually remove low contrast detail as a result of saturation. Other techniques use adaptive sharpening by increasing the contrast or bandwidth only at the higher contrast image edges. These gains are primarily perceptual and not physically or entropy based.

Finally, there are associations with other image attributes, such as increases of noise, that result in a perceived increase in sharpness. For example, in hardcopy prints obtained from film negatives captured in the same system, a higher perception of image noise will correlate with a sharper image. These effects are largely lower order effects of the visual system.

Two higher order effects of the visual system are also of interest. The first is filling in, in which a blind spot occurs, usually because the optic nerve is replacing photoreceptors at a site in the retina. The higher order processes of the human visual system fills in the missing information, based upon what is already present in the image. Another phenomenon in this area results from a center and surrounding area of the same gray level, separated by edge transients. The visual system assumes that the center is a different gray level based upon the edge information, even though that is not true. This is referred to as the Cornsweet illusion.

A second higher order effect occurs in motion sharpening or sharpness constancy. The visual system perceives a moving blurred edge as sharp. The higher order effects indicate defaults perceptions of the visual system, i.e. those that occur in the absence of visual information. These default perceptions can be exploited even in still images.

To perform convolution-based sharpening or edge enhancement in error diffusion, the current art suggests the use of a sharpening or edge enhancement filter. Examples of this approach can be found in U.S. Pat. No. 5,051,844, issued Sep. 24, 1991; U.S. Pat. No. 5,070,413, issued Dec. 3, 1991; and U.S. Pat. No. 5,581,317, issued December, 1996. However, performing a sharpening operation modifies the input image information. This results in a less accurate output image. Furthermore, sharpening operations can enhance or sharpen unpleasant effects such as moiré. Other techniques have suggested modulating the threshold using the input image information based on pixel position or intensity. However, this is very difficult to control and can again enhance unpleasant parts of the image.

Figure 2:
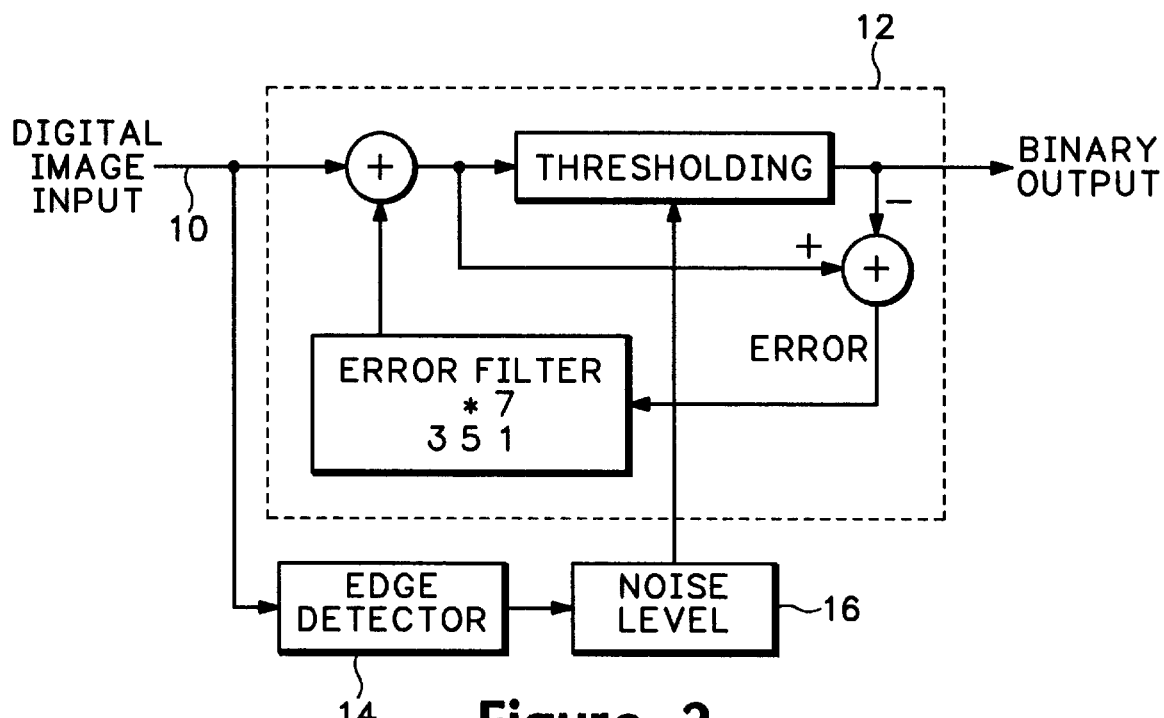
FIG. 2 shows a flowchart of a process for adaptive error diffusion in accordance with the invention.

This invention introduces a new sharpening technique to produce edge-enhanced halftoning without actually performing a sharpening or edge-enhancement operation. A flow chart for a process of adaptive error diffusion is shown in FIG. 2. As shown at step 10, the input image is received and the input image data is routed into two different processes. The first process indicated by step 12 is error diffusion. The error diffusion process can be one of any of the previously discussed approaches. It could be standard Floyd-Steinberg error diffusion, or spatially enhanced error diffusion. For purposes of this discussion, the Floyd-Steinberg error diffusion approach is assumed In addition to undergoing error diffusion, the input image is routed to an edge detector at step 14. The edge detector performs an analysis of the current pixel and it surrounding pixels to determine if that pixel is on an edge. This results in a determination of edge content. Once the edge content of a pixel is determined, the process moves to step 16.

At step 16, the edge content of the pixel is used to find a corresponding noise level to be added to that pixel. If the edge content is low or zero, very little or no noise is added to the pixel. If the edge content is high, more noise is added. The determination of the corresponding noise level can occur in several ways. One simple implementation would include a look-up table of noise scale factors. The value of the pixel combined with its noise is then used in thresholding step of the error diffusion process.

Effectively, this approach adds noise to edge pixels by changing the threshold for those pixels. The noise added to these pixels is relatively high. The larger noise value affects the thresholding decision within step 12. If the pixels are not edge pixels, the effect of the added noise is almost zero and the pixel undergoes the selected error diffusion process only. In this manner, the edge pixels are sharpened by the addition of noise, and the non-edge pixels are left alone. Noise activates high frequency channels in the human visual system, which are usually associated with sharp edges, so the perceptual effect is sharper edges.

The edge detection process at step 16 may strike a balance, adding little or no noise even if the pixel is an edge pixel. If the transition between the current pixel and its surrounding pixels is very high, the edge is already sharp and no noise may be added. The added noise values will then have a band of higher values in the middle transitions, with little or no noise added for pixels with very low edge content or that lie on a sharp edge.

The process of FIG. 2 can be expressed mathematically as follows:

$$b(i,j) = \text{step } [x(i,j) + A(m,n)*e(i-m,j-n) + \text{EdgeDetect}(X)*\text{Noise}(S) - T];$$
and $$e(i,j) = b(i,j) - [x(i,j) + A(m,n)*e(i-m,j-n)].$$

Noise(S) is any type of spatially dependent noise, such as white, green, pink, patterned or blue noise, or any of the other techniques discussed previously. However, one preferred embodiment uses high pass, or blue noise.

The path shown for adding noise can also represent an alternative approach to the addition of noise to adjust the threshold. The edge detection step 14 will again determine the magnitude of the noise 16 used in the thresholding portion of the error diffusion shown in 12. However, the noise will be added to the threshold, rather than the image data value. The pathway is essentially the same for the process flow, but the operation of the addition of the noise changes.

The implementation of this process can be in software. The software can be incorporated into image or graphic applications, raster image processors (RIP), printer, copier and other output device drivers. The same process can be implemented in hardware using application-specific integrated circuits, field-programmable gate arrays, or digital signal processors.

Additionally, the discussion up to this point has been only about gray scale. The physiologic and psychophysical effects upon which this approach is based applies in the color realm as well.

In summary, then, this invention produces edge-enhanced halftoning without performing sharpening or edge enhancement operations. This avoids enhancing or sharpening unpleasant aspects of the input image. There is no modification of the original image input, resulting in a more accurate rendering of the original input image information. Adding noise only increases the perceived edge enhancement, without affecting the original image information as would be the case with the more traditional pre-processing spatial edge enhancement.

The present invention adaptively introduces noise into the edge areas, avoiding destruction of the smoothness introduced by whichever error diffusion process is used. The process is computationally fast and can be implemented in cost-effective ways in digital printing products such as printers, copiers, and fax machines.

Thus, although there has been described to this point a particular embodiment for a method and structure for adaptive error diffusion, it is not intended that such specific references be considered as limitations upon the scope of this invention except in-so-far as set forth in the following claims.

What is claimed is:

1. A method for adaptive error diffusion, comprising the steps of:

receiving input image data;

detecting edges in said input image data;

adding noise to said input image data depending upon results of said edge detection, thereby producing noise enhanced image data;

performing error diffusion on said input image data;

altering said error diffusion dependent upon said noise enhance image data, thereby producing adaptively error diffused data; and producing output image data from said adaptively error-diffused data.

2. The method as claimed in claim 1 wherein said error diffusion is Floyd-Steinberg error diffusion.

3. The method as claimed in claim 1 wherein said error diffusion is spatially enhanced error diffusion.

4. The method as claimed in claim 1 wherein said noise added to said image data is high-pass noise.

5. The method as claimed in claim 1 wherein said noise added to said image data is white noise.

6. The method as claimed in claim 1 wherein said noise added to said image data is green noise.

7. The method as claimed in claim 1 wherein said noise added to said image data is pink noise.

8. The method as claimed in claim 1 wherein said noise added to said image data is patterned noise.

9. A method for adaptive error diffusion, comprising the steps of:

receiving input image data;

detecting edges in said input image data;

determining noise values for each pixel of said input image data, wherein said noise values depend upon results of said edge detection;

performing error diffusion on said input image data;

altering said error diffusion dependent upon said noise values for each pixel, thereby producing adaptively error diffused data; and producing output image data from said adaptively error-diffused data.

10. The method as claimed in claim 9 wherein said error diffusion is Floyd-Steinberg error diffusion.

11. The method as claimed in claim 9 wherein said error diffusion is spatially enhanced error diffusion.

12. The method as claimed in claim 9 wherein said noise added to said image data is high-pass noise.

13. The method as claimed in claim 9 wherein said noise added to said image data is white noise.

14. The method as claimed in claim 9 wherein said noise added to said image data is green noise.

15. The method as claimed in claim 9 wherein said noise added to said image data is pink noise.

16. The method as claimed in claim 9 wherein said noise added to said image data is patterned noise.

* * * * *

UNITED STATES PATENT AND TRADEMARK OFFICE
CERTIFICATE OF CORRECTION

PATENT NO. : 6,671,068 B1
DATED : December 30, 2003
INVENTOR(S) : Chang et al.

It is certified that error appears in the above-identified patent and that said Letters Patent is hereby corrected as shown below:

Column 1,
Line 23, "are irepeatedly compared" should read -- are repeatedly compared --.

Column 2,
Line 28, "e(ij)=55/16=3.44." should read --  e(i,j)=55/16=3.44. --.

Signed and Sealed this

Sixth Day of July, 2004

JON W. DUDAS
*Acting Director of the United States Patent and Trademark Office*